July 10, 1962

J. D. MILLER ET AL 3,043,898

GAS DEPOLARIZED BATTERY

Filed April 24, 1956

INVENTORS
JAMES D. MILLER
LEONARD J. GORDON
EDMUND P. DAVIS JR.

BY

ATTORNEY

INVENTORS
JAMES D. MILLER
LEONARD J. GORDON
EDMUND P. DAVIS JR.
BY
ATTORNEY

United States Patent Office 3,043,898
Patented July 10, 1962

3,043,898
GAS DEPOLARIZED BATTERY
James D. Miller, Long Beach, and Leonard J. Gordon, Sierra Madre, Calif., and Edmund P. Davis, Memphis, Tenn., assignors to Aerojet-General Corporation, Azusa, Calif., a corporation of Ohio
Filed Apr. 24, 1956, Ser. No. 580,417
19 Claims. (Cl. 136—86)

This invention relates to a new and improved gaseous deporalized battery, and in particular, to a gaseous depolarized battery capable of delivering a high current density at a constant potential over long periods of time. This battery is particularly useful as a source of electric power for submarine and underwater missile propulsion.

The effectiveness of submarine and missile warfare is dependent upon a sustained power supply, noiseless operation and the absence of detectable waste products. At the present time, the most practical means of producing power while satisfying these requirements is by converting chemical energy into electrical power. Unfortunately, conventional storage cells are not suitable for use in submarine or underwater missiles inasmuch as it is not possible to store sufficient energy in them to permit sustained operation over long periods of time.

Primary cells, which employ gaseous depolarizers, stored apart from the cell, do not suffer these limitations and are suitable for these applications. Such cells are comprised of a metallic anode, a porous cathode through which the depolarizer is fed into the cell, and an electrolytic contact between the electrodes. To permit the cell to operate for long periods of time, the metallic anodes are of considerable thickness. Unfortunately, as the metallic anodes are consumed, the distance between the electrode surfaces changes, causing a corresponding change in the voltage output of the cell.

The battery of this invention is comprised of a number of gaseous depolarized, metal primary cells cemented together in a series and provided with a tension means which compresses the cells as the metallic anodes are consumed so that the distance between the electrode surfaces remains constant, thus maintaining the voltage output constant.

According to this invention, a series of primary cells having metallic anodes, porous cathodes, a carrier material between the electrodes and a means for dripping an electrolytic solution onto said carrier material, are cemented together, the anode of one cell being cemented to the cathode of the next and so on. The cell series is held between two support plates which abut the ends of the cell series. Tension means such as a spring, screw or lever maintains a constant compression force between the end plates. As the thickness of the metallic anode decreases, the compressive force upon the end plates moves the electrodes so that the distance between the electrode surfaces remains constant. The primary cell itself comprises a metallic anode, an electrolytic solution, and a cathode having a surface element backed by a porous diffuser into which extends a depolarizer inlet manifold and a depolarizer outlet manifold. The passage of the depolarizer from the inlet manifold, through the diffuser to the outlet manifold, sweeps the inerts into the exhaust. Preferably, the electrolytic solution is circulated through a solid, porous carrier residing between the electrodes, providing a means of removing reaction products from the cell, but preventing the formation of a hydrostatic head.

The features of our novel battery will be better understood from the accompanying drawings, of which:

Figure 1:
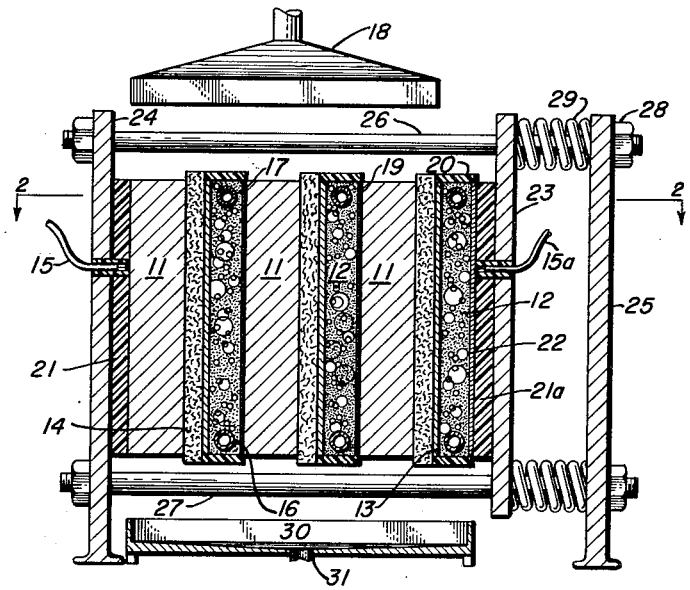
FIG. 1 shows an elevation view partly in section of a battery incorporating the features of this invention.
Figure 2:
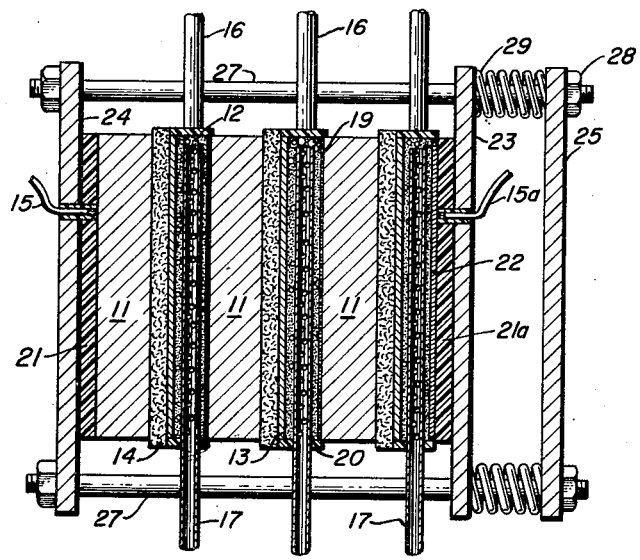
FIG. 2 shows a cross sectional view of the battery taken at line 2—2 of FIG. 1.

Referring to FIGS. 1 and 2, a battery having a plurality of primary cells is shown partly in section. Each primary cell unit is comprised of a metallic anode 11, a cathode comprised of a diffuser 12 and a surface element 13 and a porous carrier material 14 positioned between the electrodes. A terminal 15 is attached to the anode 11 and a terminal 15a is attached to a conductive plate 22 to draw off electrical current. The anode 11 of each cell is cemented by seal 19 to the diffuser 12 of the adjacent cell. An exhaust manifold 16 and an inlet manifold 17 extend into each diffuser. The inlet manifolds 17 are communicable with a source of gaseous depolarizer (not shown). The exhausted gases from manifolds 16 can either be collected and reused or vented to the atmosphere.

Above the cell series there is provided a shower head 18 through which electrolytic solution is dripped onto the carrier material 14. Below the cells is a drip pan 30 having a drain 31 for collecting the electrolytic solution after it has passed through the carrier material. The exposed surfaces of the diffusers and the seals 19 are covered with insulation 20 and the ends of the cell series are coated with insulation 21 and 21a.

The cell series is supported by a rack comprising parallel plates 23, 24 and 25, and lateral support rods 26 and 27. The support rods are rigidly secured to plate 24, pass through plate 23, and are secured by bolts 28 to plate 25. Plate 23 is laterally moveable along the support rods 26 and 27. Between plates 23 and 24 is the cell series, positioned so that its electrodes are parallel to the plates. Between plate 23 and plate 25 are compression springs 29. As the metallic anodes 11 are consumed during operation of the battery, the expansion of springs 29 slides the movable plate 23 toward the stationary plate 24, thus maintaining a constant distance between the electrode surfaces.

Figure 3:
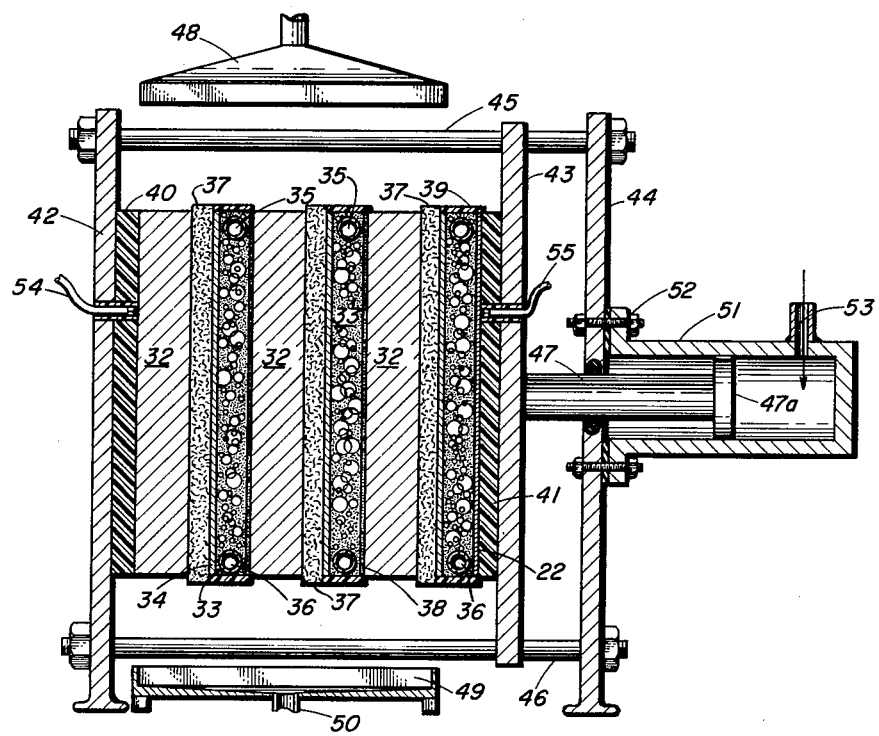
FIG. 3 shows an elevation view partly in section of a modification of the invention.

Referring to FIG. 3, another embodiment of the invention is shown. The primary cells are similar to those shown in FIG. 1. The metallic anodes 32 are cemented by seals 38 to the diffuser 33 of the neighboring cell. Molded to each diffuser 33 is a surface element 34. The external surface of the diffusers 33 and the seals 38 are covered with insulation 39. An inlet manifold 35 and an exhaust manifold 36 extend into each diffuser 33. Between the electrodes is positioned a carrier material 37.

The ends of the cell series are covered by sheets of insulation 40 and 41 and abutted against plates 42 and 43. A third plate 44 is braced against plate 42 by means of lateral support rods 45 and 46. The third plate 43 is tensioned against plate 42 by piston 47. Above the cells is a shower head 48. Electrolytic solution is dripped through the shower head 48 onto the carrier material 37. Below the cells is pan 49 with a drain 50. Terminals 54 and 55 are provided to draw off generated electric power.

The piston 47 is enclosed within a piston chamber 51 attached to the plate 44 by bolts 52. The chamber 51 is connected to a source of pressurized gas through conduit 53 whereby gas pressure against the piston face 47a compresses the cell assembly thereby maintaining the distance between electrodes constant.

It will be appreciated that a variety of tension providing means can be used in place of springs and gas pressure. Other suitable means include hydraulic pressure, simple levers, etc. Such modifications are considered within the skill of the art and hence within the scope of this disclosure.

The depolarizers useful in the primary cells described above are gases which exhibit high electronegativity. Examples of suitable depolarizers are oxygen, chlorine, bromine and air, as well as mixtures of such depolarizers.

The appropriate electrolyte to be used in the cell is of course dependent upon the particular electrochemical couple employed. For example, when chlorine is employed, neutral or slightly acid solutions are preferred such as solutions of the alkali and alkaline earth metal halides, sulfates and nitrates, as well as the halide, sulfate and nitrate salts of aluminum, manganese, zinc, chromium, iron, cadmium, cobalt and mixtures thereof. Electrolytic solutions such as sea water and tap water can also be used if desired. When oxygen is employed as the depolarizer, neutral or slightly basic salts are preferred such as the alkali and alkaline earth metal halides, sulfates and nitrates, and hydroxides of metals such as the alkali and alkaline earth metals. Tap water and sea water can also be used. As air is a form of oxygen depolarizer, the electrolytes useful with oxygen are also useful with air.

The metallic anode can be any conductive material commonly used as an anode in a metal-chlorine or metal-oxygen cell, such as iron, zinc, magnesium, manganese and aluminum as well as alloys thereof. As a matter of convenience, expense and weight, materials such as zinc and magnesium are generally employed.

The carrier material can be any solid, porous material which is not dissolved by the electrolytic solution or decomposed by the passage of the ions. Materials useful as carriers include felted cotton, glass wool and synthetic fibers such as copolymers of acrylonitrile and vinyl chloride.

The surface element can be constructed of carbon or any metal which is inert with respect to the depolarizer. As a matter of convenience, carbon is ordinarily employed when the depolarizer is chlorine, and activated carbon is used when the depolarizer is air or oxygen. Other materials such as platinum, palladium or silver can also be used if desired. The surface element is usually made by evenly spreading dry carbon black into a hollow mold placed upon the carrier material. A binder material is then added and the mix is pressed into a solid cake. If desired, the surface element can be molded onto the diffuser.

The diffuser is constructed of a solid porous material which is inert to the depolarizer. As a matter of cost and availability, graphite or carbon is preferred and the element is made by cutting the material to the desired shape. When the depolarizer is oxygen, materials such as sintered nickel and iron can be used if desired. The diffusers shown in the drawings are cemented to the surface element. In addition, an active surface may be formed on the diffuser itself, as by electroplating silver onto porous nickel.

In primary cells of the above type, the preferred method of using the electrolytic solution is by dripping it from a shower head or similar device onto the carrier material as shown. The circulation and renewal of the solution prevents the accumulation of inerts in the carrier material and also prevents the development of a hydrostatic head in the system. When this method is used the cell need not be encased, hence a substantial weight reduction can be obtained. However, if desired, the electrodes can be merely dipped into the electrolytic solution in the conventional manner.

Figure 4:
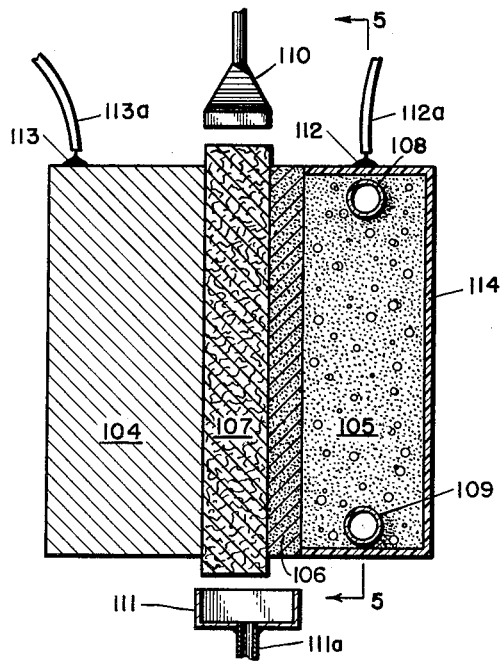
FIG. 4 shows an elevation view in section of a primary cell incorporating the features of this invention but without the anode-moving means.

Referring now to FIG. 4, a primary cell of the above described type is shown to have a metallic anode 104 and a cathode composed of a diffuser 105 and a surface of active element 106. The outside of the diffuser 105 is covered with an inert, resinous coating 114. An inlet manifold 108 and an outlet manifold 109 extend into the interior of the diffuser 105. A carrier 107 for the electrolyte is positioned between the electrodes. The electrolytic solution is dripped through a shower head 110, positioned above the cell onto the carrier 107. The solution passes through the carrier to a pan 111 having a drain 111a for collecting the electrolyte. Terminals 112 and 113 are attached to the electrodes for collecting the current and leads 112a and 113a as shown.

Figure 5:
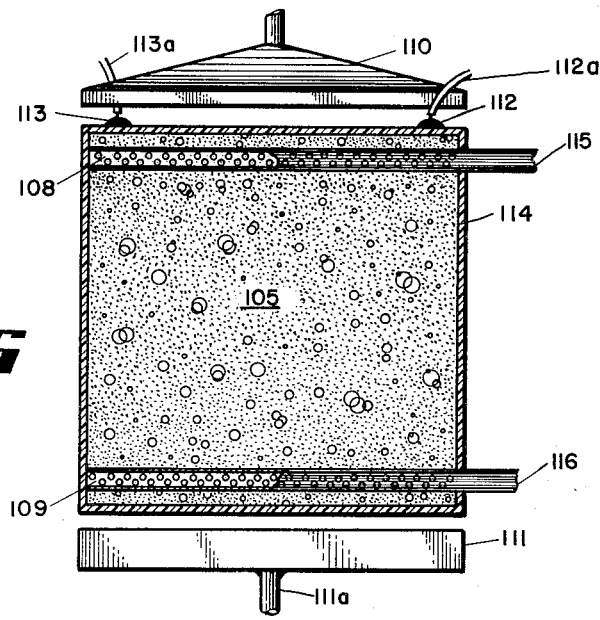
FIG. 5 shows a cross sectional view of the primary cell taken at line 5—5 of FIG. 4.

Referring to FIG. 5, a cross sectional view of the diffuser 105 taken at line 5—5 of FIG. 4 is shown. The inlet manifold 108 extends into the diffuser 105. A conduit 115 is attached to the orifice of the inlet manifold 108 which is connected to a source of depolarizer. The outlet manifold 109 also extends into the diffuser 105. An exhaust 116 is attached to its orifice.

The depolarizers useful in the primary cell described above are gases which exhibit high electronegativity. Examples of suitable depolarizers are oxygen, chlorine, bromine, and air.

The appropriate electrolyte to be used in the cell is of course dependent upon the particular electrochemical couple employed. For example, when chlorine is employed, neutral or slightly acid solutions are preferred such as the alkali and alkaline earth metal halides, sulfates and nitrates, as well as the halide, sulfate and nitrate salts of aluminum, manganese, zinc, chromium, iron, cadmium, cobalt and mixtures thereof. Electrolytic solutions such as sea water and tap water can also be used if desired. When oxygen is employed as the depolarizer, neutral or slightly basic salts are preferred such as the alkali and alkaline earth metal halides, sulfates and nitrates, and hydroxides of metals such as the alkali and alkaline earth metals. Tap water and sea water can also be used. As air is a form of oxygen depolarizer, the electrolytes useful with oxygen are also useful with air.

The metallic anode can be any conductive material conventionally used as an anode in a metal-chlorine or metal-oxygen cell, such as iron, zinc, magnesium, manganese and aluminum as well as alloys thereof. As a matter of convenience, expense and weight, zinc and magnesium are preferred.

The carrier material can be any solid, porous material which is not dissolved by the electrolytic solution or decomposed by the passage of the ions. Materials useful as carriers are felted cotton, glass wool and synthetic fibers such as copolymers of acrylonitrile and vinyl chloride.

The surface element 106 can be constructed of carbon or any metal which is inert with respect to the depolarizer. As a matter of convenience, carbon is ordinarily employed when the depolarizer is chlorine and activated carbon is used when the depolarizer is air or oxygen. Other materials such as platinum, palladium or silver can also be used if desired. The surface element is usually made by evenly spreading dry carbon black into a hollow mold placed upon the carrier material. A binder material is then added and the mix is pressed into a solid cake. If desired, the surface element can be molded onto the diffuser.

The diffuser is constructed of a solid porous material which is inert to the depolarizer. For reasons of cost and convenience, graphite or carbon is preferred. The element is made by machining the material to the desired shape. When the depolarizer is oxygen, materials such as sintered nickel and iron can be used if desired. The diffuser 105 shown in the drawings is cemented to the surface element. In addition, an active surface may be formed on the diffuser itself, e.g., by electroplating silver onto porous nickel.

In the primary cell of this invention, the preferred method of adding the electrolytic solution is by dripping it from a shower head onto a carrier material as shown in the drawings. The circulation and renewal of the solution prevents the accumulation of inert materials in the carrier material and also prevents development of a hydrostatic head in the system. When this method is used the cell need not be encased, hence a substantial weight reduction is obtained. If desired, however, the electrodes can be merely dipped into the electrolytic solution in the conventional manner.

In the operation of the primary cell shown in the drawings, the electrolytic solution is dripped onto the carrier material and allowed to seep through to the drain, thereby wetting the surface element and anode. The depolarizer then diffuses into the surface element where it reacts with the electrolytic solution. The removal of the depolarizer by this reaction causes more depolarizer to diffuse into the surface element. The concentration of inerts remaining from the reaction and the flow of depolarizer through the surface element causes said inerts to diffuse toward the diffuser, where they are swept to the exhaust manifold by the flow of depolarizer in that direction. The exhaust duct can be so arranged as to permit recirculation of the depolarizer after removing contaminants if desired.

The vastly superior performance of primary cells incorporating the features of this invention is evident from the operating data of the typical cells presented below.

Typical performance data of a primary cell as shown in FIG. 4, employing a zinc anode, a 20% potassium hydroxide electrolytic solution, air as a depolarizer and a cell area of 14.7 sq. in., is as follows:

TABLE I

| Air Flow, cc/min. | Current, Amperes | Voltage |
|---|---|---|
| 69 | 1.00 | 1.13 |
| 69 | 3.00 | 1.02 |
| 138 | 3.50 | 1.04 |
| 138 | 4.00 | 0.99 |

Typical performance data of a primary cell as shown in FIG. 4 employing a zinc anode, sea water as the electrolyte, a cell area of 30 sq. in., and chlorine as the depolarizer, is as follows:

TABLE II

Current, amperes:                                        Voltage
8.0 _____ 1.87
15.0 _____ 1.74
25.0 _____ 1.56

Typical performance data of a primary cell as shown in FIG. 4 employing a zinc anode, sea water as the electrolyte, a cell area of 8 sq. in., and chlorine as the depolarizer, is as follows:

TABLE III

*Readings at End of 20 Hours' Operation*

Current, amperes:                                        Voltage
2.15 _____ 1.72
4.40 _____ 1.55
6.60 _____ 1.42
8.80 _____ 1.32
11.0 _____ 1.20

*Readings at End of 42 Hours' Operation*

Current, amperes:                                        Voltage
2.15 _____ 1.64
4.40 _____ 1.45
6.60 _____ 1.27
8.80 _____ 1.15
11.0 _____ 1.00

Typical performance data of a primary cell as shown in FIG. 4 employing a magnesium anode, sea water as the electrolyte, oxygen as the depolarizer and a cell area of 3.84 sq. in., is as follows:

TABLE IV

Current density, amperes/sq. in.               Voltage
0.055 _____ 1.2
0.078 _____ 1.1
0.107 _____ 1.0
0.134 _____ 0.9
0.164 _____ 0.8
0.194 _____ 0.7
0.221 _____ 0.6

As can be seen from the above data, the primary cell of this invention has a high power output and can be operated continuously for extended periods of time without becoming exhausted. It is apparent that these primary cells overcome the undesirable features which have heretofore prevented the use of gas depolarized primary cells for underwater propulsion. It is further apparent that these primary cells fulfill all of the requirements for use in submarines and underwater missiles; a result unobtainable by the use of storage batteries or other types of primary cells known at the present time.

It will be appreciated by those skilled in the art that a plurality of cells of the type described can be joined together in either series or parallel arrangement to meet particular needs. Other refinements such as collecting and recycling electrolyte or depolarizer can also be employed.

In the operation of the battery shown in the drawings, the electrolytic solution is added dropwise and allowed to seep through the carrier material thereby wetting the surface element and anode. Excess electrolyte is collected by the drain. The depolarizer is pumped through the pores of the diffuser to the exhaust manifold and to the surface element. In the surface element the depolarizer reacts with the electrolytic solution. The reaction at the cathode causes the metallic anode to react with free ions in the electrolytic solution and thus gradually dissolves. The spring means 29 shown in FIG. 1 or the piston assembly shown in FIG. 3 maintain a constant pressure against the ends of the battery, thus as the metallic anode dissolves, the distance between the electrode surfaces is kept constant.

Typical performance of a zinc-chlorine battery consisting of five primary cells having the design described above, each cell being 2" x 4" x 5/8", is presented in Table V.

TABLE V

| Time Operation (Hours) | Output Voltage (volts) | Current (Amps) | Current Density Amp/sq. in. |
|---|---|---|---|
| 1 | 7.8 | 1.0 | .125 |
| 5 | 7.6 | 1.0 | .125 |
| 24 | 7.5 | 1.0 | .125 |

As can be seen from the above data, the battery of this invention has a high power output and can be operated continuously for extended periods of time without becoming exhausted while providing constant voltage output. The batteries of this invention are free from the undesirable features which have heretofore prevented the use of gaseous depolarized batteries for applications such as underwater propulsion.

In addition to the particular embodiments of the invention shown in the drawings and specification, various modifications and adaptations may be made in the cell design, construction and use without departing from the scope of the invention. For example different electrolytes, anodic metals, liner materials and carrier materials will be obvious to those skilled in the art. Therefore, we limit the scope of our invention only by the appended claims.

We claim:

1. A cell for generating electric voltage which comprises in combination a consumable anode and, a cathode comprising a porous diffuser, said diffuser having means for circulating gaseous depolarizer through said diffuser, a layer of inert porous carrier material between said anode and cathode so that said anode and cathode have surfaces which face each other and are separated from each other by the carrier material, means for circulating electrolyte in a separate and distinct path from said circulating depolarizer through said porous carrier material, and means for maintaining the distance between the facing surfaces of said anode and cathode constant despite the consumption of the anode by compression of said cell in a manner whereby both said electrodes move toward each other at a rate substantially equal to the rate of consumption of said anode.

2. Cell apparatus for generating electric current which comprises in combination a consumable metal anode, a composite cathode comprising a surface element and a porous diffuser, said surface element being on the side of said cathode facing the anode and said diffuser incorporating means for continuously circulating gaseous depolarizer through said diffuser; a layer of inert porous material in contact with and positioned between said anode and said surface element, means for continuously circulating electrolyte in a separate and distinct path from said circulating depolarizer through said porous carrier material and means for maintaining the distance between facing surfaces of said anode and cathode constant in use despite the consumtion of said anode by compression of said cell in a manner whereby both said electrodes move toward each other at a rate substantially equal to the rate of consumption of said anode.

3. Apparatus according to claim 2 wherein said means for maintaining the distance between the facing surface of said anode and cathode constant comprises a spring tension means.

4. Apparatus according to claim 2 wherein said means for maintaining the distance between the facing surface of said anode and cathode constant comprises a piston and pressure source.

5. A battery comprising a plurality of cells, each according to claim 1, said cells being arranged in series.

6. A primary galvanic cell comprising in combination: a consumable anode electrode; a composite cathode electrode comprising a surface element and a porous diffuser; a layer of inert porous carrier material arranged between said electrodes and in contact with said anode electrode and said surface element; means for circulating fluid electrolyte through said porous carrier material; means for circulating a gaseous depolarizer in a separate and distinct path from said circulating depolarizer through said cathode electrode porous diffuser; and means for maintaining constant the distance of separation of said consumable anode electrode and said surface element by compression of said cell in a manner whereby both said electrodes move toward each other at a rate substantially equal to the rate of consumption of said anode.

7. Cell apparatus for generating electric current, comprising in combination, a consumable metal anode; a composite cathode; a layer of inert porous carrier material; means for introducing electrolyte into said porous carrier material; said composite cathode comprising an active element and a porous diffuser, one surface of said active element being arranged in bearing relationship with said porous diffuser, and another surface of said active element providing an interface between said composite cathode and said electrolyte-carrying inert porous carrier material; said layer of electrolyte-carrying porous material being arranged between said active element and consumable anode; said diffuser incorporating means for introducing gaseous depolarizer in a separate and distinct path from said circulating depolarizer into said diffuser; means for extracting the gaseous depolarizer from said diffuser whereby said depolarizer circulates through said diffuser; means for receiving the electrolyte after it has passed through said porous carrier material whereby the electrolyte circulates through said inert porous carrier material; and means for maintaining constant the distance between said active element and said consumable anode by compression of said cell in a manner whereby both said electrodes move toward each other at a rate substantially equal to the rate of consumption of said anode.

8. Apparatus for generating electric current which comprises in combination an anode, a composite cathode comprised of a surface element capable of being entered by gas and by liquid electrolyte and a porous diffuser, said diffuser having means for circulating gaseous depolarizer through said diffuser, a layer of inert porous carrier material between said electrodes and in contact with said anode and with said surface element, and means for circulating electrolyte through said porous carrier material, whereby the electrolyte and depolarizer enter into and meet within said surface element.

9. Apparatus according to claim 8 wherein said means for circulating gaseous depolarizer comprises a manifold open to the interior of said diffuser.

10. Apparatus according to claim 8 wherein said porous diffuser is carbon.

11. Apparatus according to claim 8 wherein said surface element is a carbon cake.

12. Apparatus according to claim 8 wherein said carrier is glass wool.

13. Apparatus according to claim 18 wherein said carrier is a material selected from the group consisting of animal, vegetable and synthetic fibers.

14. Apparatus according to claim 18 wherein said means for introducing gaseous depolarizer comprises a manifold open to the interior of said diffuser.

15. Apparatus according to claim 18 wherein said porous diffuser is carbon.

16. Apparatus according to claim 18 wherein active surface element is a carbon cake.

17. Apparatus according to claim 18 wherein said carrier is glass wool.

18. Cell apparatus for generating electric current, comprising, in combination: a metal anode; a composite cathode; a layer of inert porous carrier material; means for introducing electrolyte into said porous carrier material; said composite cathode comprising an active element and a porous diffuser, one surface of said active element being arranged in touching relationship with said porous diffuser, and another surface of said active element providing an interface between said composite cathode and said electrolyte-carrying inert porous carrier material; said layer of electrolyte-carrying porous material being arranged between said active element and said anode; said diffuser incorporating means for introducing gaseous depolarizer into said diffuser; means for extracting the gaseous depolarizer from said diffuser whereby said depolarizer circulates through said diffuser; and means for receiving the electrolyte from said porous carrier material whereby the electrolyte circulates through said inert porous carrier material.

19. A primary galvanic cell comprising in combination: an anode electrode; a composite cathode electrode comprising a surface element and a porous diffuser; a layer of inert porous carrier material arranged between said electrodes and in contact with said anode electrode and said surface element; means for circulating fluid electrolyte through said porous carrier material; and means for circulating a gaseous depolarizer through said cathode electrode porous diffuser in a flow parallel to the interface of said cathode electrode surface element and said porous carrier material.

References Cited in the file of this patent
UNITED STATES PATENTS

| | | |
|---|---|---|
| 651,247 | Hess | June 5, 1900 |
| 668,838 | Lavison | Feb. 26, 1901 |
| 963,852 | Benko | July 12, 1910 |
| 2,572,296 | Zimmerman et al. | Oct. 23, 1951 |
| 2,612,532 | Heise et al. | Sept. 30, 1952 |

(Other references on following page)

UNITED STATES PATENTS

| | | |
|---|---|---|
| 2,640,865 | Brennan | June 2, 1953 |
| 2,921,110 | Crowley et al. | Jan. 12, 1960 |

FOREIGN PATENTS

| | | |
|---|---|---|
| 14,050 | Great Britain | June 6, 1912 |
| | 1911 | |
| 667,298 | Great Britain | Feb. 27, 1952 |

OTHER REFERENCES

B.I.O.S. Final Report No. 362. Item No. 31, pp. 18–22. Recd. Lib. of Congress June 11, 1946.

Heise et al.: "J. Electrochemical Society," vol. 94, No. 3, pages 99–105, September 1948.